US012722650B2

(12) United States Patent
Mankame et al.

(10) Patent No.: US 12,722,650 B2
(45) Date of Patent: Sep. 1, 2026

(54) SMART VEHICLE SYSTEMS AND CONTROL LOGIC WITH VIRTUAL RUMBLE STRIP FUNCTIONS FOR INTELLIGENT TRAFFIC MANAGEMENT

(71) Applicant: GM GLOBAL TECHNOLOGY OPERATIONS LLC, Detroit, MI (US)

(72) Inventors: Nilesh D. Mankame, Ann Arbor, MI (US); Babak Makkinejad, Troy, MI (US); Paul E. Krajewski, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 104 days.

(21) Appl. No.: 18/667,228

(22) Filed: May 17, 2024

(65) Prior Publication Data

US 2025/0353520 A1 Nov. 20, 2025

(51) Int. Cl.
*B60W 50/16* (2020.01)

(52) U.S. Cl.
CPC ......... *B60W 50/16* (2013.01); *B60W 2530/10* (2013.01); *B60W 2556/50* (2020.02); *B60W 2756/10* (2020.02)

(58) Field of Classification Search
CPC ............. B60W 50/16; B60W 2530/10; B60W 2556/50; B60W 2756/10
See application file for complete search history.

(56) References Cited

U.S. PATENT DOCUMENTS

| | | | | |
|---|---|---|---|---|
| 7,711,464 | B2 | 5/2010 | Kaufmann | |
| 7,885,730 | B2 | 2/2011 | Kaufmann et al. | |
| 9,123,215 | B2 | 9/2015 | Kiefer et al. | |
| 9,139,204 | B1 | 9/2015 | Zhao et al. | |
| 9,153,108 | B2 * | 10/2015 | Kiefer | G08B 6/00 |
| 9,199,668 | B2 | 12/2015 | Zeng et al. | |
| 9,349,263 | B2 | 5/2016 | Kiefer et al. | |
| 11,029,688 | B2 * | 6/2021 | Batts | G05D 1/0274 |
| 2004/0049323 | A1 * | 3/2004 | Tijerina | B60N 2/00 701/1 |
| 2004/0056762 | A1 * | 3/2004 | Rogers | G08G 5/53 340/425.5 |
| 2005/0149251 | A1 * | 7/2005 | Donath | G01C 21/26 340/995.14 |

(Continued)

*Primary Examiner* — Sze-Hon Kong
(74) *Attorney, Agent, or Firm* — Quinn IP Law

(57) ABSTRACT

Presented are smart vehicle systems with control logic that provision virtual rumble strip functionality, methods for making/using such systems, and vehicles equipped with such systems. A method of operating a vehicle includes a vehicle controller wirelessly receiving location data indicative of the vehicle's real-time location, and then retrieving geopositional data associated with the vehicle's real-time location and containing a virtual rumble strip zone. The vehicle controller then determines a virtual characteristic set that defines a series of virtual rumble strips within the virtual rumble strip zone, and concurrently determines a sequence of haptic cues that simulate the virtual rumble strips. The vehicle controller detects when the vehicle's real-time location enters the virtual rumble strip zone; upon detecting entry of the vehicle into the virtual rumble strip zone, the controller responsively commands the haptic feedback system to generate the sequence of haptic cues perceptible by an occupant of the vehicle.

20 Claims, 2 Drawing Sheets

(56) References Cited

U.S. PATENT DOCUMENTS

2005/0236210 A1* 10/2005 Kawazoe ................ B60T 17/22
180/272
2014/0249718 A1* 9/2014 Liu .......................... G08G 1/16
701/1
2016/0107570 A1* 4/2016 Modarres ............. B62D 15/029
340/435
2016/0129920 A1* 5/2016 Hall ...................... B60W 40/08
701/1
2017/0313246 A1* 11/2017 Chen ...................... B60Q 9/008
2023/0311923 A1* 10/2023 Kuehner .................. B60N 2/90
701/94
2025/0110561 A1* 4/2025 Jones ...................... G06F 3/016
2025/0242811 A1* 7/2025 Camhi Espinoza .. B60W 50/16

* cited by examiner

SMART VEHICLE SYSTEMS AND CONTROL LOGIC WITH VIRTUAL RUMBLE STRIP FUNCTIONS FOR INTELLIGENT TRAFFIC MANAGEMENT

INTRODUCTION

The present disclosure relates generally to motor vehicles with automated driver feedback systems. More specifically, aspects of this disclosure relate to smart vehicles with adaptive control systems that provision haptic-based driver feedback features.

Current production motor vehicles, such as the modern-day automobile, may be equipped with a network of onboard electronic devices that provide automated driving capabilities to optimize driver experience. In automotive applications, for example, one of the most recognizable types of automated driving features is the cruise control system. Cruise control allows a vehicle operator to set a particular vehicle speed and have the onboard vehicle computer system maintain that speed without the driver operating the accelerator or brake pedals. Next-generation Adaptive Cruise Control (ACC) is an automated driving feature that regulates vehicle speed while concomitantly managing headway spacing between the host vehicle and a leading "target" vehicle. Another type of automated driving feature is the Collision Avoidance System (CAS), which detects imminent collision conditions and provides a warning to the driver while also taking preventative action autonomously, e.g., by steering or braking without driver input. Intelligent Parking Assist Systems (IPAS), Lane Monitoring and Automated Steering ("Auto Steer") Systems, Electronic Stability Control (ESC) systems, and other Advanced Driver Assistance Systems (ADAS) are also available on many modern-day automobiles.

As vehicle processing, communication, and sensing capabilities continue to improve, manufacturers will persist in offering more automated driving capabilities with the aspiration of producing fully autonomous "self-driving" vehicles competent to operate among heterogeneous vehicle types in both urban and rural scenarios. Original equipment manufacturers (OEM) are moving towards vehicle-to-vehicle (V2V) and vehicle-to-infrastructure (V2I) "talking" cars with higher-level driving automation that employ intelligent control systems to enable vehicle routing with steering, lane changing, scenario planning, etc. Automated path planning systems utilize vehicle state and dynamics sensors, geolocation information, map and road condition data, and path prediction algorithms to provide route derivation with automated lane center and lane change forecasting.

SUMMARY

Presented below are smart vehicle systems with control logic that provision virtual rumble strip features for intelligent traffic management, methods for manufacturing and methods for operating such systems, and motor vehicles equipped with such systems. Intelligent Traffic Management (ITM) systems are context-aware solutions that combine sensor, telecommunications, and information technologies to improve traffic and travel times for automobiles. Intelligent traffic management around sensitive driving areas (e.g., schools, hospitals, construction zones, etc.) at critical times (e.g., start/end of school day, shift changes, rush hour, etc.) or during atypical conditions (e.g., inclement weather, road debris, etc.) may help to mitigate unwanted interactions between moving vehicles and between vehicles and pedestrians. Vehicle speed regulation around such sensitive areas is a key aspect of effective traffic management. Traditional traffic management systems employ fixed and portable hardware to regulate vehicle speeds and provide driver alerts. Portable traffic management hardware may include, for example, traffic cones, movable signage, traffic barriers, etc., that may be manually installed and, when desired, later removed to regulate vehicle movement around and through sensitive driving areas. Fixed traffic management hardware may include permanent traffic signals that regulate vehicle traffic across roadway intersections, crosswalk signals to regulate pedestrian traffic across roadway intersections, speed limit signage to govern vehicle speeds, etc. One drawback to traditional traffic management systems is the time and expense associated with installing and maintaining the necessary traffic management tools. In addition, traditional traffic management systems are not able to adapt in real-time to changing driving conditions.

Discussed below are wireless-enabled smart vehicles that use in-vehicle haptic units in conjunction with real-time location and weather data, vehicle telemetry and dynamics data, time/date data, etc., to provision driver alert features that are designed to modulate vehicle speed, e.g., in sensitive driving areas at critical times or during atypical conditions. In an example, a host vehicle wirelessly communicates with an ITM system to retrieve geospatial data that contains geofenced target zones that delineate speed-restricted areas. Upon entry of the host vehicle into one such target zone, a resident ADAS control module activates one or more driver seat-mounted haptic transducers to emulate speed-mitigating rumble strips. Output of the haptic transducer(s) may be actively governed, e.g., using pulse-width modulation techniques, to actively modify haptic pulse intensity, frequency, and duration in order to simulate a virtual depth, width, and/or density of the rumble strips.

Simulated rumble strip may be created when vehicle operation is deemed to be inconsistent with ITM directives and may persist until vehicle operation is determined to be consistent with those directives. Physical rumble strips have been developed to provide a jarring sensation to drivers and occupants when the vehicle is being operated in a manner that is inconsistent with prescribed operation directives (e.g., host vehicle is exceeding a speed limit in a school zone, veering off the shoulder of a road, etc.). Drivers who experience the jarring sensation induced by physical rumble strips may become conditioned to adjust their operation of the vehicle to mitigate this sensation. The smart vehicle systems proposed herein may help to provide timely intervention in a targeted manner to help manage traffic flow by tapping into pre-conditioned driver reflexes.

Aspects of this disclosure are directed to smart vehicle control systems, memory-stored vehicle control protocols, and vehicle control logic for provisioning virtual rumble strip functionality. In an example, a method is presented for operating a motor vehicle that has a vehicle body, a passenger compartment within the vehicle body, and a haptic feedback system with one or more haptic feedback devices within the vehicle body. This representative method includes, in any order and in any combination with any of the above and below disclosed options and features: receiving, e.g., via a resident or remote microcontroller, control module, logic device, or network of controllers/modules/devices (collectively "controller") through a short-range or long-range wireless communications device, location data indicative of the vehicle's real-time location; retrieving, e.g., via the vehicle controller from an ITM system server or remote host service, geopositional data associated with the vehicle's real-time location and containing a virtual rumble strip zone; locating, accepting, or calculating (collectively "determining"), e.g., via the vehicle controller, a virtual characteristic set that defines a series of virtual rumble strips within the virtual rumble strip zone; determining, e.g., via the vehicle controller based on the virtual characteristic set, a sequence of haptic cues perceptible by an occupant of the motor vehicle and designed to simulate the virtual rumble strips within the virtual rumble strip zone; detecting, e.g., via the vehicle controller using the received location data, when the real-time vehicle location is within the virtual rumble strip zone; and commanding, e.g., via the vehicle controller responsive to determining the real-time vehicle location is in the virtual rumble strip zone, the haptic feedback system to generate the sequence of haptic cues.

Aspects of this disclosure are also directed to computer-readable media (CRM) containing controller-executable instructions for executing virtual rumble strip features by a host motor vehicle. In an example, a non-transient CRM stores instructions that are executable by one or more processors of a vehicle controller of a motor vehicle. The CRM-stored instructions, when executed by the processor(s), cause the vehicle controller to perform operations, including: receiving, via a wireless communications device, location data indicative of a real-time vehicle location of the motor vehicle; retrieving geopositional data associated with the real-time vehicle location and containing a virtual rumble strip zone; determining a virtual characteristic set defining a series of virtual rumble strips within the virtual rumble strip zone; determining, based on the virtual characteristic set, a sequence of haptic cues configured to simulate the virtual rumble strips within the virtual rumble strip zone; detecting when the real-time vehicle location is in the virtual rumble strip zone; and commanding, responsive to the real-time vehicle location being within the virtual rumble strip zone, a haptic feedback system to generate a sequence of haptic cues perceptible by an occupant of the motor vehicle.

Additional aspects of this disclosure are directed to motor vehicles equipped with occupant feedback control systems for provisioning virtual rumble strip functionality. As used herein, the terms "vehicle" and "motor vehicle" may be used interchangeably and synonymously to include any relevant vehicle platform, such as passenger vehicles, commercial vehicles, industrial vehicles, off-road and all-terrain vehicles (ATV), motorcycles, farm equipment, watercraft, aircraft, etc. In an example, a motor vehicle includes a vehicle body with a passenger compartment, multiple road wheels mounted to the vehicle body (e.g., via corner modules coupled to a unibody or body-on-frame chassis), and other standard original equipment. A prime mover, which may be in the nature of a traction motor and/or internal combustion engine assembly, is located inside the vehicle body and drives the road wheel(s) to propel the vehicle. Also attached to the vehicle body are a wireless communications device and a haptic feedback system, the latter of which includes one or more haptic devices located within the vehicle passenger compartment.

Continuing with the discussion of the foregoing example, the vehicle is also equipped with a resident or remote vehicle controller that is programmed to wirelessly receive location data that is indicative of the vehicle's real-time location. The vehicle controller concomitantly retrieves geopositional data that is associated with the vehicle's real-time location and contains data delineating one or more virtual rumble strip zones proximal to and/or ahead of the vehicle. The vehicle controller then determines a virtual characteristic set that defines a series of virtual rumble strips within each virtual rumble strip zone. From the virtual characteristic set data, the controller determines a sequence of haptic cues that is perceptible by an occupant of the vehicle and designed to simulate the virtual rumble strips. The vehicle controller detects when the vehicle's real-time location enters a virtual rumble strip zone; upon entry of the vehicle into the virtual rumble strip zone, the controller responsively commands the haptic feedback system to generate the sequence of haptic cues, e.g., to alert the driver to decrease vehicle speed and/or modify vehicle trajectory.

For any of the disclosed vehicles, methods, and CRM, each virtual characteristic set contains data that defines a digital depth, width, and/or density of the virtual rumble strips; the corresponding haptic cue sequence may be configured to physically simulate the digital depth, width, and/or density of the virtual rumble strips. The term "virtual rumble strip", as used herein, may be characterized as an intangible digital construct that lacks any physical structure. As a further option, the vehicle controller may determine a series of pulse-width modulation (PWM) signals based on the virtual characteristic set defining the series of virtual rumble strips. In this instance, each PWM signal may correspond to a respective haptic cue in the sequence of haptic cues. These PWM signals may define a duty cycle for the sequence of haptic cues, including an intensity, duration, and/or frequency of the haptic cues.

For any of the disclosed vehicles, methods, and CRM, the controller-retrieved geopositional data may contain data that delineates multiple discrete virtual rumble strip zones proximal to and/or ahead of the host vehicle. In this instance, each virtual rumble strip zone may correspond to a distinct set of virtual characteristics defining a distinct series of virtual rumble strips; as such, the vehicle controller may determine a distinct haptic cue sequence for the respective series of virtual rumble strips within each virtual rumble strip zone. As another option, the vehicle's wireless communications device may include an on-vehicle Global Positioning System (GPS) transceiver, and the location data may include a four-dimensional (4D) spacetime coordinate set. Moreover, the geopositional data may define each virtual rumble strip zone as a respective geofenced surface area of a roadway segment proximate to and/or forward of the real-time vehicle location. The vehicle controller may wirelessly receive the geopositional data from an Intelligent Traffic Management system, a central vehicle services system, or an open-source map database. Alternatively, the geopositional data may be retrieved from resident memory or by a resident vehicle navigation system.

For any of the disclosed vehicles, methods, and CRM, the vehicle controller may determine a vehicle characteristic set that is specific to the subject "host" vehicle; the controller may then modulate the haptic cue sequence simulating the virtual rumble strips based on the vehicle characteristic set. In this instance, the vehicle characteristic set may contain data designating a vehicle powertrain type, a vehicle curb weight, a vehicle wheel base, and/or a vehicle make/model/trim specific to the host vehicle. As another option, the vehicle controller may determine driving variables data that is indicative of real-time driving characteristics of the motor vehicle; the controller may then modulate the haptic cue sequence simulating the virtual rumble strips based on the driving variables data. In this instance, the driving variables data may contain real-time vehicle dynamics data, real-time vehicle telemetry data, real-time traffic data, and/or real-time driving conditions data.

For any of the disclosed vehicles, methods, and CRM, the haptic feedback system may include a network of haptic feedback units, including a first (left) haptic device located proximate a first (left) side of the occupant and a second (right) haptic device located proximate a second (right) side of the occupant. In this instance, the virtual characteristic set may indicate that the virtual rumble strip zone and corresponding rumble strips are located on left (or right) side of the host vehicle. The vehicle controller may responsively command the left (or right) haptic device to generate the sequence of haptic cues to simulate that the virtual rumble strips are on the left (or right) side of the motor vehicle. As a further option, the motor vehicle may include one or more vehicle seats, each of which is mounted inside the passenger compartment and designed to seat thereon an occupant. In this instance, the left and right haptic devices may be packaged in port and starboard sides, respectively, of a seatback or a seat bottom of a vehicle seat.

The above summary does not represent every embodiment or every aspect of the present disclosure. Rather, the foregoing summary merely provides a synopsis of some of the novel concepts and features set forth herein. The above features and advantages, and other features and attendant advantages of this disclosure, will be readily apparent from the following Detailed Description of illustrated examples and representative modes for carrying out the disclosure when taken in connection with the accompanying drawings and appended claims. Moreover, this disclosure expressly includes any and all combinations and subcombinations of the elements and features presented above and below.

Figure 1:
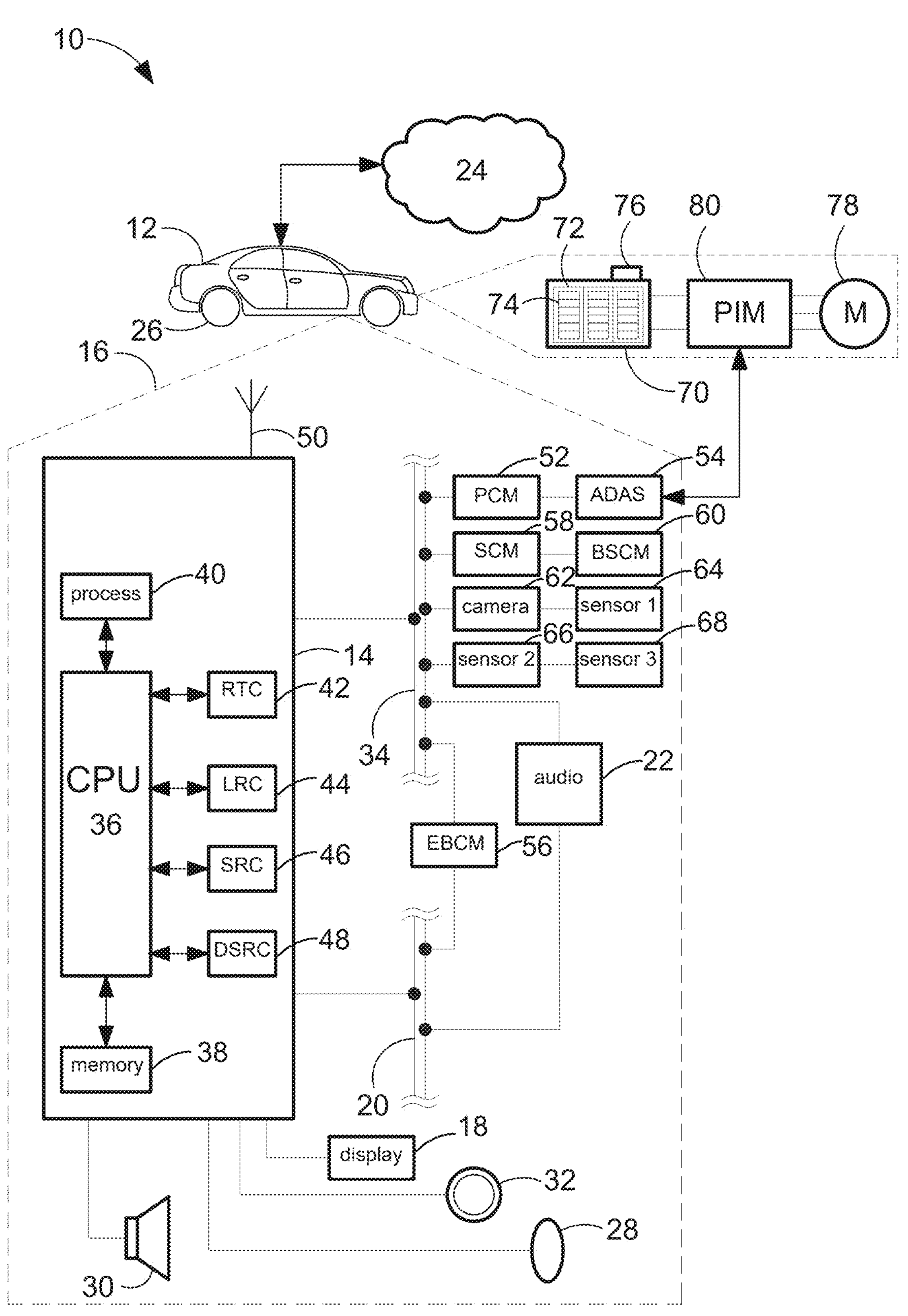
FIG. 1 is a partially schematic side-view illustration of a representative motor vehicle with a network of on-vehicle controllers, sensors, haptic feedback units, and communication devices for provisioning virtual rumble strip functions in accordance with aspects of the present disclosure.

The present disclosure is amenable to various modifications and alternative forms, and some representative embodiments of the disclosure are shown by way of example in the drawings and will be described in detail herein. It should be understood, however, that the novel aspects of this disclosure are not limited to the particular forms illustrated in the above-enumerated drawings. Rather, this disclosure covers all modifications, equivalents, combinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, Brief Description of the Drawings, and Detailed Description sections, but not explicitly set forth in the claims, should not be incorporated into the claims, singly or collectively, by implication, inference or otherwise. Moreover, recitation of "first", "second", "third", etc., in the specification or claims is not per se used to establish a serial or numerical limitation; unless specifically stated otherwise, these designations may be used for ease of reference to similar features in the specification and drawings and to demarcate between similar elements in the claims.

For purposes of this disclosure, unless specifically disclaimed: the singular includes the plural and vice versa (e.g., indefinite articles "a" and "an" should generally be construed as meaning "one or more"); the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein to denote "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving surface.

Referring now to the drawings, wherein like reference numbers refer to like features throughout the several views, there is shown in FIG. 1 a representative motor vehicle, which is designated generally at 10 and portrayed herein for purposes of discussion as a sedan-style, electric-drive automobile. The illustrated automobile 10—also referred to herein as "motor vehicle" or "vehicle" for short—is merely an exemplary application with which aspects of this disclosure may be practiced. In the same vein, execution of the present concepts by the illustrated network of vehicle hardware devices should be appreciated as a non-limiting implementation of disclosed features. As such, it will be understood that aspects and features of this disclosure may be carried out by other vehicle device architectures and may be incorporated into any logically relevant type of vehicle. Moreover, only select components of the motor vehicle and smart vehicle control system are shown and described in detail herein. Nevertheless, the vehicles and systems discussed below may include numerous additional and alternative features, and other available peripheral hardware, for carrying out the various methods and functions of this disclosure.

The representative vehicle 10 of FIG. 1 is originally equipped with a vehicle telecommunications and information ("telematics") unit 14 that wirelessly communicates, e.g., via cellular network, satellite service, wireless-enabled modem, etc., with a remotely located or "off-board" cloud computing host service 24 (e.g., ONSTAR®). Some of the other vehicle hardware components 16 shown generally in FIG. 1 include, as non-limiting examples, an electronic video display device 18, a microphone 28, audio speaker(s) 30, and assorted user input controls 32 (e.g., buttons, knobs, pedals, switches, touchpads, joysticks, touchscreens, etc.). These hardware components 16 function, in part, as a human/machine interface (HMI) that enables a user to communicate with the telematics unit 14 and other components resident to and remote from the vehicle 10. Microphone 28, for instance, provides occupants with a means to input verbal or other auditory commands; the vehicle 10 may be equipped with an embedded voice-processing unit utilizing audio filtering, editing, and analysis modules. Conversely, the speaker 30 provides audible output to a vehicle occupant and may be either a stand-alone speaker dedicated for use with the telematics unit 14 or may be part of an audio system 22. The audio system 22 is operatively connected to a network connection interface 34 and an audio bus 20 to receive analog information, rendering it as sound, via one or more speaker components.

Communicatively coupled to the telematics unit 14 is a network connection interface 34, suitable examples of which include twisted pair/fiber optic Ethernet switches, parallel/serial communications buses, local area network (LAN) interfaces, controller area network (CAN) interfaces, and the like. The network connection interface 34 enables the vehicle hardware 16 to send and receive signals with one another and with various systems both onboard and off-board the vehicle body 12. This allows the vehicle 10 to perform assorted vehicle functions, such as modulating powertrain output, activating friction and regenerative brake systems, controlling vehicle steering, and other automated functions. For instance, telematics unit 14 may exchange signals with a Powertrain Control Module (PCM) 52, an Advanced Driver Assistance System (ADAS) module 54, an Electronic Battery Control Module (EBCM) 56, a Steering Control Module (SCM) 58, a Brake System Control Module (BSCM) 60, and assorted other vehicle ECUs, such as a transmission control module (TCM), engine control module (ECM), Sensor System Interface Module (SSIM), etc.

With continuing reference to FIG. 1, telematics unit 14 is an onboard computing device that provides a mixture of services, both individually and through its communication with other networked devices. This telematics unit 14 may be generally composed of one or more processors 40, each of which may be embodied as a discrete microprocessor, an application specific integrated circuit (ASIC), or a dedicated control module. Vehicle 10 may offer centralized vehicle control via a central processing unit (CPU) 36 that is operatively coupled to a real-time clock (RTC) 42 and one or more electronic memory devices 38, each of which may take on the form of a CD-ROM, magnetic disk, IC device, a solid-state drive (SSD) memory, a hard-disk drive (HDD) memory, flash memory, semiconductor memory (e.g., various types of RAM or ROM), etc.

Long-range communication (LRC) capabilities with remote, off-board devices may be provided via one or more or all of a cellular chipset/component, a navigation and location chipset/component (e.g., global positioning system (GPS) transceiver), or a wireless modem, all of which are collectively represented at 44. Close-range wireless connectivity may be provided via a short-range communication (SRC) device 46 (e.g., a BLUETOOTH® unit or near field communications (NFC) transceiver), a dedicated short-range communications (DSRC) component 48, and/or a dual antenna 50. The communications devices described above may provision data exchanges as part of a periodic broadcast in a vehicle-to-vehicle (V2V) communication system or a vehicle-to-everything (V2X) communication system, e.g., Vehicle-to-Infrastructure (V2I), Vehicle-to-Pedestrian (V2P), Vehicle-to-Device (V2D), Vehicle-to-Cloud (V2C), etc.

CPU 36 receives sensor data from one or more sensing devices that use, for example, photo detection, radar, laser, ultrasonic, optical, infrared, or other suitable technology, including short range communications technologies (e.g., DSRC) or Ultra-Wide Band (UWB) radio technologies, for executing a controller-automated (AV/ADAS) driving operation or a vehicle navigation service. In accord with the illustrated example, the automobile 10 may be equipped with one or more digital cameras 62, one or more range sensors 64, one or more vehicle speed sensors 66, one or more vehicle dynamics sensors 68, and any requisite filtering, classification, fusion, and analysis hardware and software for processing raw sensor data. The type, placement, number, and interoperability of the distributed array of in-vehicle sensors may be adapted, singly or collectively, to a given vehicle platform for achieving a desired level of automated vehicle operation.

Digital camera(s) 62 may use a complementary metal oxide semiconductor (CMOS) sensor or other suitable optical sensing device to generate images indicating a field-of-view of the vehicle 10, and may be configured for continuous image generation, e.g., at least about 50+ images per second. By way of comparison, range sensor(s) 64 may emit and detect reflected radio, infrared, light-based, or other electromagnetic signals (e.g., short-range radar, long-range radar, EM inductive sensing, Light Detection and Ranging (LIDAR), etc.) to detect, for example, presence, speed, proximity, etc., of a target object. Vehicle speed sensor(s) 66 may take on various forms, including wheel speed sensors that measure wheel speeds, which are then used to determine real-time host (ego) speed. In addition, the vehicle dynamics sensor(s) 68 may be in the nature of a single-axis or a triple-axis accelerometer, an angular rate sensor, an inclinometer, etc., for detecting longitudinal and lateral acceleration, yaw, roll, and/or pitch rates, or other dynamics related parameters. Using data from these on-vehicle sensing devices, the CPU 36 may identify surrounding driving conditions, determine roadway characteristics and surface conditions, identify target objects within a detectable range of the vehicle, determine attributes of the target object, such as size, relative position, orientation, distance, angle of approach, relative speed, etc., and executes automated control maneuvers based on these executed operations.

To propel the motor vehicle 10, an electrified powertrain is operable to generate and deliver tractive torque to one or more of the vehicle's drive wheels 26. The powertrain is represented in FIG. 1 by a rechargeable energy storage system (RESS), which may be in the nature of a chassis-mounted traction battery pack 70, that is operatively connected to an electric traction motor (M) 78. The traction battery pack 70 is generally composed of one or more battery modules 72 each containing a cluster of battery cells 74, such as lithium-class, zinc-class, nickel-class, or organosilicon-class cells of the pouch, can, or cylindrical type. One or more electric machines, such as traction motor/generator (M) units 78, draw electrical power from and, optionally, deliver electrical power to the battery pack 70. A power inverter module (PIM) 80 electrically connects the battery pack 70 to the motor(s) 78 and modulates the transfer of electrical current therebetween. The battery pack 70 may include an integrated electronics package, such as a wireless-enabled cell monitoring unit (CMU) 76, that enables on-module management, cell sensing, and module-to-module and/or module-to-host communications functionality.

During operation of the motor vehicle 10 of FIG. 1, it may become necessary to regulate vehicle speed and trajectory when entering a sensitive driving area or when inadvertently departing from a designated driving lane. Discussed below are smart vehicle systems with attendant control logic with automated haptic feedback, e.g., for virtual rumble strip simulation, intelligent traffic management, adaptive driver alerts, etc. By way of example, and not limitation, an advanced driver assistance system controller (e.g., ADAS module 54 of FIG. 1) selectively activates a networked array of haptic alert units embedded within an occupant seat to emulate a dynamic vehicle response to a physical road feature, such as rumble strips, speed bumps, centerline rumble stripes and raised markers, etc. In so doing, the vehicle 10 is able to manage vehicle operation and traffic flow by tapping into a preconditioned driver reflex to such road feature(s), thus eliminating a need for physical road features and/or modification of the road surface. The ADAS controller may also use location, time, vehicle telemetry, and weather information to enforce traffic regulations based on localized road and traffic conditions.

Rather than provide a single "shared" system response for all road features, the vehicle 10 may vary the temporal nature of an activation signal (e.g., frequency, duty cycle, and/or pulse width) to tailor the haptic system output to each virtual road feature. For instance, the ADAS system may employ one predefined series of haptic cues to emulate rumble strips, a different predefined series of haptic cues to emulate speed bumps, and yet another distinct predefined series of haptic cues to emulate raised centerline markers. Moreover, a virtual road feature zone's designation as active or inactive for a particular region may be dependent upon the time of day (e.g., rumble strip zone active for traffic flow in one direction in the morning and inactive for traffic flow in opposite direction at night). It is also envisioned that a trigger sensitivity level and a feedback intensity level may be varied depending upon the time of day (e.g., construction zone rumble strips less sensitive and less intense during nighttime), road conditions (e.g., virtual rumble strip zone dynamically generated and activated for a predetermined period for new collision event), and/or weather conditions (e.g., discrete virtual rumble strip zones dynamically generated and temporarily activated for areas identified as having black ice).

In addition to exploiting preexisting driver reflexes to influence driver behavior, disclosed haptic feedback systems and control logic may provide immediate and visceral feedback that may be tied to various data input feeds, such as a real-time vehicle speed relative to a recommended vehicle speed. For at least some implementations, a vehicle owner, lessor, driver, or passenger (collectively "occupant" or "user") may be provided with a user-selectable option to enable (opt-in) or disable (opt-out) a traffic management mode that permits any of the herein described in-vehicle haptic feedback features. By employing existing vehicle hardware, disclosed haptic systems and logic are relatively inexpensive with minimal additional computational load, and may be readily adaptable and scalable to any logically relevant vehicle platform. Disclosed haptic feedback systems and logic may be used to modulate traffic in multifarious driving scenarios, like parking lots, school zones, construction zones, high-flow intersections. Moreover, in-vehicle haptic feedback may be used to selectively enforce high-occupancy vehicle (HOV) lanes, to dynamically create preferential routes for predetermined "special" vehicles (e.g., school buses, ambulances, fire engines, police vehicles, etc.), and/or to provide incentives to induce desired behaviors (e.g., disincentivize the use of non-EVs in business districts by enabling haptic features with virtual rumble strips in lieu of congestion charge).

Figure 2:
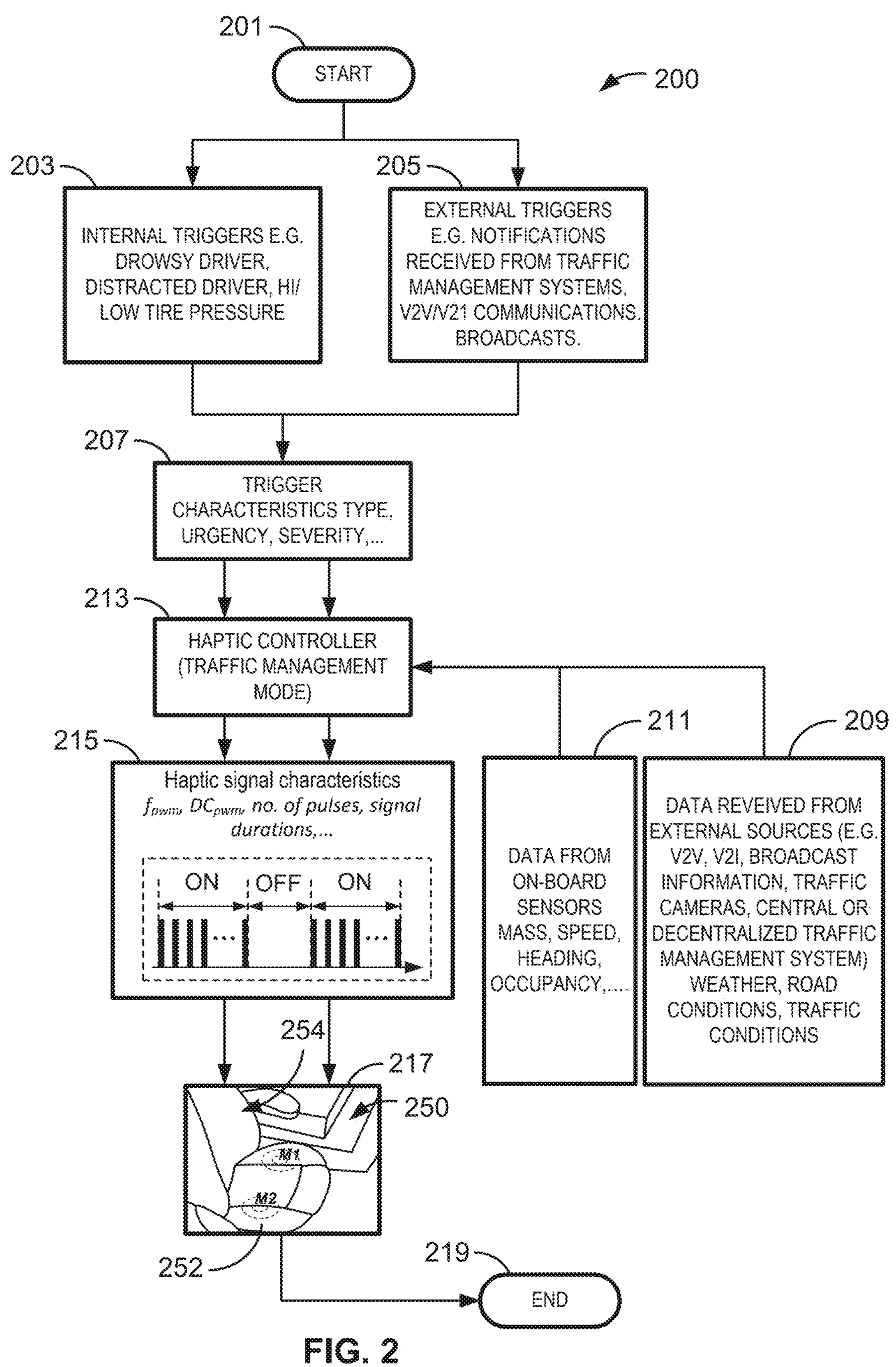
FIG. 2 is a flowchart illustrating a representative vehicle control protocol for dynamically simulating virtual rumble strips to a driver of a vehicle, which may correspond to memory-stored instructions that are executable by a resident or remote microcontroller, control-logic circuit, system control module, or other integrated circuit (IC) device or network of circuits/modules/microcontrollers/IC devices (collectively "controller") in accordance with aspects of the disclosed concepts.

With reference next to the flow chart of FIG. 2, an improved method or vehicle control protocol for dynamically emulating a dynamic vehicle response to a physical road feature by a host vehicle, such as electric-drive automobile 10 of FIG. 1, is generally described at 200 in accordance with aspects of the present disclosure. Some or all of the operations illustrated in FIG. 2 and described in further detail below may be representative of an algorithm that corresponds to non-transitory, processor-executable instructions that are stored, for example, in main or auxiliary or remote memory (e.g., resident memory device 38 and/or remote cloud computing service 24 database of FIG. 1). These instructions may be executed, for example, by an electronic controller, processing unit, dedicated control module, logic circuit, or other module or device or network of controllers/modules/devices (e.g., CPU 36, processor(s) 40, and/or ADAS module 54 of FIG. 1), to perform any or all of the above and below described functions associated with the disclosed concepts. It should be recognized that the order of execution of the illustrated operation blocks may be changed, additional operation blocks may be added, and some of the herein described operations may be modified, combined, or eliminated.

Method 200 begins at START terminal block 201 of FIG. 2 with memory-stored, processor-executable instructions for initializing a traffic management mode for a subject "host" vehicle equipped with a haptic feedback system. This routine may be available for initialization in real-time, near real-time, continuously, systematically, sporadically, and/or at predefined time intervals, for example, each 10 or 100 milliseconds during operation of the motor vehicle 10. As yet another option, terminal block 201 may initialize responsive to a user command prompt (e.g., via telematics 14 input controls), a resident vehicle controller prompt (e.g., from CPU 36), or a broadcast prompt signal received from a centralized back-office (BO) vehicle services system (e.g., from cloud host service 24). By way of non-limiting example, method 200 may initialize by presenting a vehicle occupant with a telematics touchscreen-selectable option to enable a controller-automated traffic management mode and, once presented, the user responsively authorizing the traffic management mode. User authorization of the traffic management mode need not be selected for each drive cycle; rather, traffic management mode may be memory-stored as a user preference that is selected once and, perhaps, periodically reaffirmed. Upon completion of some or all of the control operations presented in FIG. 2, method 200 may advance to END terminal block 219 and temporarily terminate or, optionally, may loop back to terminal block 201 and run in a continuous loop.

Advancing from terminal block 201 to EXTERNAL TRIGGER data input block 203, method 200 executes instructions for receiving an external trigger that will elicit emulation of a physical road feature. Non-limiting examples of an external trigger may include a notification received from a server-class computer of an Intelligent Traffic Management (ITM) system, a V2V/V2I alert, a central vehicle services broadcast, etc. In conjunction with input block 203, method 200 may also or alternatively execute INTERNAL TRIGGER data input block 205 for receiving an internal trigger that will elicit haptic-based feedback to alert a driver of the host vehicle. Non-limiting examples of an internal trigger may include in-vehicle sensor data indicating the driver is drowsy or distracted, there is a detected vehicle fault, the host vehicle has hi/low tire pressure, etc. It is also envisioned that a user may choose to have an explanatory message provided by an in-vehicle audio component and/or video component that provides a reason for the alert.

In accord with the illustrated example of FIG. 1, the vehicle CPU 36 may collaborate with a resident wireless communications device, such as LRC device 44 or SRC device 46, to continually receive location data that denotes a real-time vehicle location of the host motor vehicle 10. As indicated above, the vehicle 10 may be equipped with an on-vehicle GPS transceiver that wirelessly communicates with a satellite service to live-track vehicle location. Location data received from the satellite service may include a four-dimensional (4D) spacetime coordinate set (e.g., decimal-degree x, y, and z-coordinates; and timestamp) or, alternatively, may take on any recognized GPS coordinate format (e.g., Prime Meridian lat/lon, Universal Transverse Mercator (UTM), etc.). Even without a GPS receiver, the vehicle 10 can determine location and movement information through cooperation with a cellular system through cell-tower trilateration techniques, using multi-hop Geocast V2V data exchanges, short-range V2I data broadcast, or other suitable location tracking techniques.

After ascertaining the host vehicle's real-time location, a vehicle controller may retrieve geopositional data that corresponds to the real-time vehicle location and contains information delineating one or more virtual rumble strip zones proximal to and/or forward of the vehicle. Automobile 10 of FIG. 1, for example, may wirelessly receive geopositional data containing virtual rumble strip zone information from an Intelligent Traffic Management system that is responsible for regulating traffic on the roadway across which the host vehicle is presently traversing. It is envisioned that such geopositional data may contain information delineating a single rumble strip zone or multiple distinct and separate virtual rumble strip zones within the vicinity of the host vehicle or along a predicted path of the host vehicle. Each virtual rumble strip zone may have a distinct location, a distinct length, a distinct width, and/or a distinct type of rumble strips. For simplicity and case of reference, the geopositional data may define each virtual rumble strip zone as a respective geofenced surface area of a roadway segment proximate to and/or forward of the host vehicle's real-time location and trajectory.

Continuing with the discussion of the EXTERNAL TRIGGER data input block 203 of FIG. 2, method 200 may actively receive and analyze vehicle location data to determine whether or not the host vehicle's real-time location breaches a predefined virtual rumble strip zone. In an example, the outer boundaries of a virtual rumble strip zone may be delineated by a virtual perimeter or "geofence" that is predefined or is dynamically generated by an ITM system controller to establish a speed-restricted area. Once generated, the CPU 36 tracks the real-time vehicle location and, in tandem, the ADAS module 54 detects when the vehicle 10 breaches the geofence. Upon determining that the real-time vehicle location has breached the geofence and, thus, the host vehicle is now within one of the virtual rumble strips zones, the method 100 may advance to process blocks 207, 209 and 211 to determine an appropriate system response to best simulate the virtual rumble strips within the virtual rumble strip zone.

Method 200 advances to TRIGGER CHARACTERISTIC data input block 207 to identify one or more characteristics particular to the virtual road feature(s) contained within the virtual zone entered by the host vehicle. Non-limiting examples of virtual road feature characteristics may include a road feature type, an urgency of the associated alert, a severity of the associated alert, etc. In accord with the illustrated example of FIG. 1, the vehicle 10 may receive from the ITM system, retrieve from resident memory 38, or otherwise determine a set of virtual characteristics that defines a series of virtual rumble strips within a given virtual rumble strip zone. The virtual characteristic set may define a road feature type (e.g., rumble strip, speed bump, centerline rumble stripe, or raised lane marker), a digital vertical depth/height (e.g., 0.25-0.50 inches deep/high), a digital fore-aft width (e.g., 3-7 inches wide), a digital transverse length (e.g., 8-16 inches long), a digital density (e.g., 8-14 inch spacing), a zone length (e.g., 20-50 yards), a zone location (e.g., right shoulder, centerline, or in lane), etc. The foregoing characteristics may be actively determined at process block 213; process block 215 then interprets these characteristics and maps them to the haptic drive signal characteristics (e.g., PWM frequency, duty cycle, duration, etc.). For applications in which a host vehicle may interact with multiple virtual zones, each virtual rumble strip zone may correspond to a distinct set of virtual characteristics that defines a distinct series of virtual rumble strips within that zone.

Contemporaneous with data input block 207, method 200 may execute ONBOARD SENSOR data input block 209 to collect, from one or more resident sensing devices, vehicle sensor data that would likely affect the host vehicle's dynamic response to traversing the virtual road features (i.e., if they were their physical counterpart). Motor vehicle 10 of FIG. 1, for example, may aggregate data output by the vehicle speed sensor(s) 66 and vehicle dynamics sensor(s) 68 to assess the host vehicle's current speed, mass, heading, occupancy, etc., each of which may affect the vehicle suspension and steering when the vehicle 10 drives over actual rumble strips. Other examples of pertinent onboard sensor data may include driving variables data indicative of real-time driving characteristics of the host vehicle, such as real-time vehicle dynamics data (e.g., acceleration, roll, pitch, yaw), real-time vehicle telemetry data (e.g., vehicle performance and health metrics), driver-specific data (e.g., historical driving behavior), etc.

Method 200 may also execute OFFBOARD SENSOR data input block 211 to collect, from one or more remote sensing devices, sensor data that may affect the host vehicle's dynamic response to traversing the virtual road features. Motor vehicle 10 of FIG. 1, for example, may wirelessly communicate via LRC device 44 with the ITM system or cloud computing host service 24 to retrieve real-time traffic data, real-time driving conditions data, and real-time weather data. At the same time, motor vehicle 10 may wirelessly communicate via SRC device 46 with crowd-sourced vehicles (V2V) and ITM hardware (V2I) to aggregate traffic camera data, traffic signal phasing data, broadcast roadway information, etc. It is also envisioned that the motor vehicle 10 may retrieve a set of vehicle characteristics specific to the host vehicle. Such vehicle characteristic data may include a vehicle powertrain type (e.g., FWD, RWD, 4WD, AWD), a vehicle curb weight (e.g., total vehicle weight exclusive of occupants and cargo), a vehicle wheel base (e.g., distance from center of driver-side front wheel to center of driver-side rear wheel), and/or a vehicle make/model/trim (e.g., 2019 GMC Yukon SLT).

The trigger characteristics data, onboard sensor data, and offboard sensor data collected at blocks 207, 209 and 211 may be input to HAPTIC CONTROLLER process block 213 to determine an appropriate haptic system response to best simulate the virtual rumble strips within the virtual rumble strip zone to an occupant of the host vehicle. To do so, method 200 may execute HAPTIC SIGNAL subroutine block 215 to actively determine a set of signal characteristics for a corresponding sequence of haptic signals that will control operation of an in-vehicle haptic feedback system 250. The haptic signal characteristic set may include, for example, a pulse-width modulation (PWM) frequency $f_{pwm}$, a PWM duty cycle $DC_{pwm}$, a total number of pulses $N_{pwm}$, and a signal duration $D_{pwm}$. In the example of FIG. 1, vehicle CPU 36 may use the virtual characteristic set, vehicle characteristic set, and driving variables data to compute a sequence of haptic cues for simulating the virtual rumble strips within a given virtual rumble strip zone.

To more accurately emulate physical rumble strips, the haptic cue sequence may be actively adapted to simulate the digital depth, width, and/or density of the virtual rumble strips. For instance, vehicle CPU 36 may compute a series of pulse-width modulation signals based on the virtual characteristic data output by input block 207, the onboard sensor data output by input block 209, and/or the offboard sensor data output by input block 211. That is, the PWM frequency $f_{pwm}$, duty cycle $DC_{pwm}$, total number of pulses $N_{pwm}$, and/or signal duration $D_{pwm}$ may be individually increased or decreased depending on current vehicle speed, current vehicle acceleration/deceleration, current gross vehicle weight (GVW), vehicle-specific wheel base, vehicle-specific powertrain, etc. Each PWM signal in the series of PWM signals may correspond to a respective haptic cue in the sequence of haptic cues. PWM signal characteristic variation and, thus, haptic feedback system response may also be adapted in a similar manner to more closely emulate current road conditions, current weather conditions, and current traffic conditions.

As noted above, the computed PWM signals may define a duty cycle for the sequence of haptic cues, including an intensity, a duration, and/or a frequency of the haptic cues. For operating scenarios in which a host vehicle may interact with multiple virtual rumble strip zones, a respective sequence of haptic cues may be generated for each series of virtual rumble strips in each virtual rumble strip zone. In addition to adapting the haptic feedback system response to each virtual rumble strip zone, the sequence of haptic cues for a given virtual rumble strip zone may be tailored to vehicle-specific variables of a given host vehicle. For instance, the PWM signals may be modulated based on the host vehicle's vehicle-specific characteristic set and/or driving variables data.

Method 200 may advance from process block 213 and subroutine block 215 to HAPTIC FEEDBACK subroutine 217 and concomitantly command the in-vehicle haptic feedback system 250 to generate the computed sequence of haptic cues in a manner that is perceptible by an occupant of the host vehicle in order to simulate the virtual rumble strips within the virtual rumble strip zone. Upon determining that the real-time vehicle location is within the virtual rumble strip zone, for example, the ADAS module 54 may selectively activate a first (left) haptic device M1 proximate a first (left) side of the occupant and/or a second (right) haptic device M2 located proximate a second (right) side of the occupant based on the computed and modulated PWM signals generated at subroutine block 215. According to the illustrated example of FIG. 2, the two haptic devices M1 and M2 are packaged in port and starboard sides, respectively, of a seat bottom 252 of a vehicle passenger-side vehicle seat 254 that is mounted inside the host vehicle's passenger compartment. As noted above, data input block 207 may identify a road feature type and a zone location for each virtual road feature zone. In an instance in which the virtual road feature type is designated as recessed rumble strips located on a right shoulder of the roadway (i.e., right passenger side of vehicle), the ADAS module 54 may activate only the right haptic device M2 to generate a sequence of haptic cues designed to simulate the virtual rumble strips on the right side of the host vehicle. It is also envisioned that the haptic-based virtual rumble strip mode and attendant operations be integrated with the vehicle's audiovisual system, e.g., to inform the occupants via audio cue and/or visual cue.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software, or a combination thereof, in a computer system or other processing system.

Any of the methods described herein may include machine readable instructions for execution by: (a) a processor, (b) a controller, and/or (c) any other suitable processing device. Any algorithm, software, control logic, protocol, or method disclosed herein may be embodied as software stored on a tangible medium such as, for example, a flash memory, a solid-state drive (SSD) memory, a hard-disk drive (HDD) memory, a CD-ROM, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms may be described with reference to flowcharts and/or workflow diagrams depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method of operating a motor vehicle having a vehicle body and a haptic feedback system attached to the vehicle body, the method comprising:

receiving, via a vehicle controller through a wireless communications device of the motor vehicle, location data indicative of a real-time vehicle location of the motor vehicle;

retrieving, via the vehicle controller of the motor vehicle, geopositional data associated with the real-time vehicle location and containing a virtual rumble strip zone;

determining, via the vehicle controller, a virtual characteristic set defining a series of virtual rumble strips within the virtual rumble strip zone;

determining, via the vehicle controller based on the virtual characteristic set, a sequence of haptic cues that simulate the virtual rumble strips within the virtual rumble strip zone;

determining a series of pulse-width modulation (PWM) signals to generate the sequence of haptic cues that simulate the series of virtual rumble strips, wherein each PWM signal in the series of PWM signals corresponds to a respective haptic cue in the sequence of haptic cues, the PWM signals defining a duty cycle for the sequence of haptic cues, a PWM signal intensity and duration for each of the haptic cues, and a frequency of the haptic cues within the duty cycle;

detecting, via the vehicle controller using the received location data, when the real-time vehicle location is within the virtual rumble strip zone; and commanding, via the vehicle controller responsive to determining the real-time vehicle location is within the virtual rumble strip zone, the haptic feedback system to generate the sequence of haptic cues perceptible by an occupant of the motor vehicle.

2. The method of claim 1, wherein the virtual characteristic set defines a digital depth, width, and/or density of the virtual rumble strips, the sequence of haptic cues being configured to simulate the digital depth, width, and/or density of the virtual rumble strips.

3. The method of claim 1, wherein the virtual rumble strip zone includes multiple discrete virtual rumble strip zones, the virtual characteristic set includes multiple distinct virtual characteristic sets each corresponding to a respective one of the virtual rumble strip zones, and the sequence of haptic cues includes multiple distinct haptic cue sequences each corresponding to a respective series of virtual rumble strips of one of the virtual rumble strip zones.

4. The method of claim 1, further comprising:

determining a vehicle characteristic set specific to the motor vehicle; and modulating the sequence of haptic cues simulating the virtual rumble strips based on the vehicle characteristic set.

5. The method of claim 4, wherein the vehicle characteristic set includes a vehicle powertrain type, a vehicle curb weight, a vehicle wheel base, and/or a vehicle make/model.

6. The method of claim 1, further comprising:

receiving driving variables data indicative of real-time driving characteristics of the motor vehicle; and modulating the sequence of haptic cues simulating the virtual rumble strips based on the driving variables data.

7. The method of claim 6, wherein the driving variables data includes real-time vehicle dynamics data, real-time vehicle telemetry data, real-time traffic data, and/or real-time driving conditions data.

8. The method of claim 1, wherein the wireless communications device includes a Global Positioning System (GPS) transceiver, the location data includes a four-dimensional (4D) spacetime coordinate set, and the geopositional data defines the virtual rumble strip zone as a geofenced surface area of a roadway segment proximate the real-time vehicle location.

9. The method of claim 1, wherein the haptic feedback system includes first and second haptic devices located proximate first and second sides, respectively, of the occupant, the virtual characteristic set indicates that the virtual rumble strips are located on a first side of the motor vehicle, and the vehicle controller commands the first haptic device to generate the sequence of haptic cues to simulate the virtual rumble strips on the first side of the motor vehicle.

10. The method of claim 9, wherein the motor vehicle includes a vehicle seat mounted inside a passenger compartment of the motor vehicle and seating thereon the occupant, and the first and second haptic devices are packaged in port and starboard sides, respectively, of the vehicle seat.

11. The method of claim 1, wherein the geopositional data containing the virtual rumble strip zone is received, via the vehicle controller through the wireless communications device, from an Intelligent Traffic Management (ITM) system.

12. The method of claim 1, further comprising actively adapting the duty cycle and the PWM signal intensity of the PWM signals in real-time based on a vehicle weight and a current vehicle speed of the motor vehicle.

13. The method of claim 1, wherein determining the virtual characteristic set includes determining a road feature type of the virtual rumble strips within the virtual rumble strip zone, the road feature type including raised speed bumps, raised markers, and raised rumble stripes each having a digital vertical height.

14. The method of claim 1, further comprising mapping the virtual characteristic set to the series of PWM signals in real-time to derive the sequence of haptic cues that simulate the series of virtual rumble strips.

15. A non-transient, computer-readable medium storing instructions executable by one or more processors of a vehicle controller of a motor vehicle, the motor vehicle including a vehicle body and a haptic feedback system attached to the vehicle body, the instructions, when executed by the one or more processors, causing the vehicle controller to perform operations comprising:

receiving, via a wireless communications device of the motor vehicle, location data indicative of a real-time vehicle location of the motor vehicle;

retrieving geopositional data associated with the real-time vehicle location and containing a virtual rumble strip zone;

determining a virtual characteristic set defining a series of virtual rumble strips within the virtual rumble strip zone;

determining, based on the virtual characteristic set, a sequence of haptic cues configured to simulate the virtual rumble strips within the virtual rumble strip zone;

determining a series of pulse-width modulation (PWM) signals to generate the sequence of haptic cues that simulate the series of virtual rumble strips, wherein each PWM signal in the series of PWM signals corresponds to a respective haptic cue in the sequence of haptic cues, the PWM signals defining a duty cycle for the sequence of haptic cues, a PWM signal intensity and a PWM signal duration for each of the haptic cues, and a frequency of the haptic cues within the duty cycle;

detecting when the real-time vehicle location is in the virtual rumble strip zone; and commanding, responsive to the real-time vehicle location being within the virtual rumble strip zone, the haptic feedback system to generate the sequence of haptic cues perceptible by an occupant of the motor vehicle.

16. A motor vehicle, comprising:

a vehicle body with a passenger compartment;

a plurality of road wheels attached to the vehicle body;

a prime mover attached to the vehicle body and configured to drive one or more of the road wheels to thereby propel the motor vehicle;

a wireless communications device attached to the vehicle body;

a haptic feedback system including a haptic device located within the passenger compartment; and a vehicle controller communicatively connected to the wireless communications device and the haptic feedback system, the vehicle controller being programmed to:

receive, via the wireless communications device, location data indicative of a real-time vehicle location of the motor vehicle;

retrieve geopositional data associated with the real-time vehicle location and containing a virtual rumble strip zone;

determine a virtual characteristic set defining a series of virtual rumble strips within the virtual rumble strip zone;

determine a sequence of haptic cues based on the virtual characteristic set and configured to simulate the virtual rumble strips;

determine a series of pulse-width modulation (PWM) signals to generate the sequence of haptic cues that simulate the series of virtual rumble strips, each PWM signal in the series of PWM signals corresponding to a respective haptic cue in the sequence of haptic cues, the PWM signals defining a duty cycle for the sequence of haptic cues, a PWM signal intensity and duration for each of the haptic cues, and a frequency of the haptic cues within the duty cycle;

detect when the real-time vehicle location is in the virtual rumble strip zone; and responsive to determining the real-time vehicle location is within the virtual rumble strip zone, command the haptic feedback system to generate the sequence of haptic cues perceptible by an occupant of the passenger compartment.

17. The motor vehicle of claim 16, wherein the virtual characteristic set defines a digital depth, width, and/or density of the virtual rumble strips, the sequence of haptic cues being configured to simulate the digital depth, width, and/or density of the virtual rumble strips.

18. The motor vehicle of claim 16, wherein the virtual rumble strip zone includes multiple discrete virtual rumble strip zones, the virtual characteristic set includes multiple distinct virtual characteristic sets each corresponding to a respective one of the virtual rumble strip zones, and the sequence of haptic cues includes multiple distinct haptic cue sequences each corresponding to a respective series of virtual rumble strips of one of the virtual rumble strip zones.

19. The motor vehicle of claim 16, wherein the wireless communications device includes a Global Positioning System (GPS) transceiver, the location data includes a four-dimensional (4D) spacetime coordinate set, and the geopositional data defines the virtual rumble strip zone as a geofenced surface area of a roadway segment proximate the real-time vehicle location of the motor vehicle.

20. The motor vehicle of claim 16, wherein the haptic feedback system includes first and second haptic devices located proximate first and second sides, respectively, of the occupant, the virtual characteristic set indicates that the virtual rumble strips are located on a first side of the motor vehicle, and the vehicle controller commands the first haptic device to generate the sequence of haptic cues to simulate the virtual rumble strips on the first side of the motor vehicle.

* * * * *